United States Patent [19]

Paar et al.

[11] Patent Number: 4,497,307
[45] Date of Patent: Feb. 5, 1985

[54] INTEGRAL ROCKER ARM HYDRAULIC LIFTER AND BEARING ASSEMBLY

[75] Inventors: Michael S. Paar, Battle Creek; Christopher I. McCarthy, Grandville, both of Mich.

[73] Assignee: General Motors Corporation, Detroit, Mich.

[21] Appl. No.: 576,721

[22] Filed: Feb. 3, 1984

[51] Int. Cl.³ .................................................. F01L 1/18
[52] U.S. Cl. ............................ 123/90.33; 123/90.36; 123/90.39; 123/90.41; 123/90.46; 123/90.45; 384/126
[58] Field of Search ............ 123/90.33, 90.36, 90.39, 123/90.45, 90.46, 90.41; 308/212; 384/126, 92

[56] References Cited

U.S. PATENT DOCUMENTS

| | | | |
|---|---|---|---|
| 317,292 | 4/1906 | Amann | 384/126 |
| 1,624,497 | 4/1927 | McAllister | 123/90.46 |
| 2,053,743 | 9/1936 | Russell | 123/90.46 |
| 3,539,232 | 11/1970 | Batt | 308/212 |
| 4,192,263 | 3/1980 | Kitagawa et al. | 123/90.46 |
| 4,314,732 | 2/1982 | Murphy | 123/90.41 |

FOREIGN PATENT DOCUMENTS

| | | | |
|---|---|---|---|
| 228378 | 2/1925 | United Kingdom | 123/90.36 |
| 394777 | 7/1933 | United Kingdom | 123/90.46 |
| 1217213 | 12/1970 | United Kingdom | 308/212 |

Primary Examiner—Ira S. Lazarus
Assistant Examiner—R. S. Bailey
Attorney, Agent, or Firm—Arthur N. Krein

[57] ABSTRACT

A rocker arm assembly for use in the valve train of an internal combustion engine of the type having a fixed rocker shaft for supporting at least one rocker arm and having an axial passage adapted to be in continuous communication with the pressurized lubricant supply of the engine and with at least one radial riser passage extending from the axial passage; the rocker arm assembly including a rocker arm having a hydraulic lash adjuster operatively positioned in a socket provided in an arm thereof and, a hybrid bearing operatively positioned in the rocker arm so as to encircle the rocker shaft over the oil riser passage. The hybrid bearing includes an outer race having an inner cylinder race surface and a radial aperture in fluid communication with passage means extending to the lash adjuster, a plurality of needles operatively positioned on the race surface in rolling contact with a portion of the rocker shaft opposite the riser passage therein and, a semi-cylindrical sleeve bearing fixed to the outer race in operative engagement with the outer race between opposite end ones of the needles whereby to encircle the remaining portion of the rocker shaft, the sleeve bearing having a radial extending port means effecting flow communication between the riser passage in the rocker shaft and the aperture in the outer race whereby lubricant can be supplied to the hydraulic lash adjuster.

3 Claims, 4 Drawing Figures

4,497,307

INTEGRAL ROCKER ARM HYDRAULIC LIFTER AND BEARING ASSEMBLY

This invention relates to rocker arms as used in the valve train mechanisms for internal combustion engines and, in particular, to an integral rocker arm, hydraulic lifter and bearing assembly for use in a valve train mechanism of such an engine.

DESCRIPTION OF THE PRIOR ART

A common type of valve train, as used in internal combustion engines, has the rocker arms pivotably journaled, as by bearings, on a fixed rocker shaft. In certain applications, a lash adjuster of the hydraulic type is located in each rocker arm with the lash adjuster contacting either the stem of the associated valve or a valve actuator, which can, for example, be either the cam surface of a camshaft or a push rod reciprocated by a camshaft.

One of the problems encountered in the use of the latter type described rocker arm assembly is the provision for suitable lubrication of the bearing and the continuous supply of pressurized hydraulic fluid, such as lubricating oil, to the hydraulic lash adjuster.

SUMMARY OF THE INVENTION

The present invention relates to a rocker arm assembly with a hydraulic lash adjuster in unit assembly therewith, the rocker arm also having a hybrid bearing mounted therein whereby the rocker arm can be pivotably journaled on a fixed rocker shaft having an oil supply passage means therein, the hybrid bearing including a plurality of rollers positioned for rolling contact with a load contact portion of the rocker shaft and a semi-cylindrical sleeve bearing encircling the remaining portion of the rocker shaft and having port means therein in position whereby oil from the oil supply-means can be freely delivered to the hydraulic lash adjuster.

Accordingly, a primary object of this invention is to provide an improved integral rocker arm with integral hydraulic lash adjuster assembly wherein a hybrid bearing having both rollers and a semi-cylindrical apertured bearing sleeve is used to pivotably support the rocker arm on a rocker shaft.

Another object of the invention is to provide an improved composite bearing for an integral rocker arm, hydraulic lash adjuster and bearing assembly wherein the bearing includes a plurality of roller bearing elements and a fixed semi-cylindrical, sleeve bearing having an oil supply aperture means therein whereby hydraulic fluid, as supplied by a rocker shaft, can be delivered via the bearing to the hydraulic lash adjuster.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
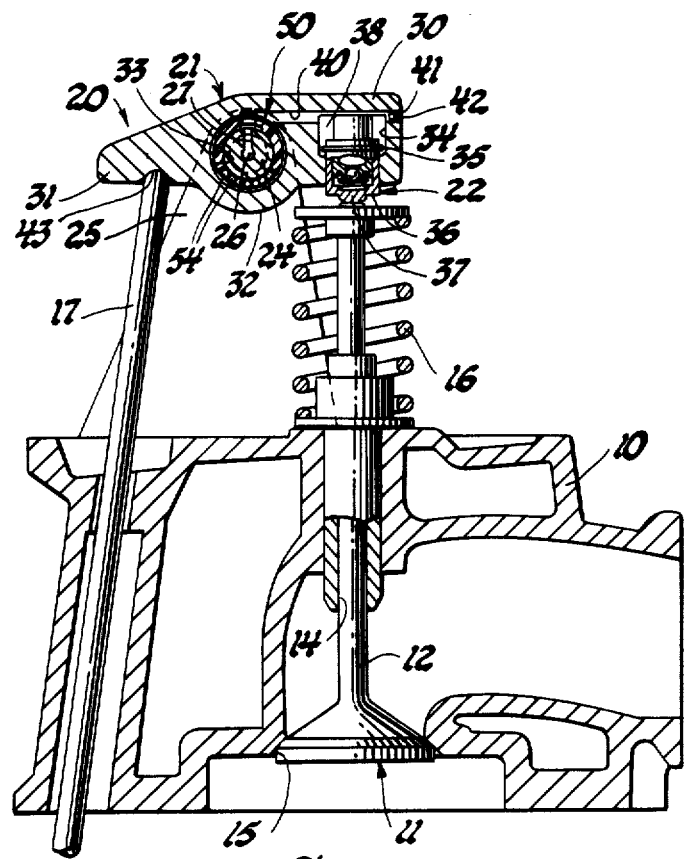
FIG. 1 is a cross-sectional view of a portion of an internal combustion engine illustrating a portion of the valve train of the engine and having an integral rocker arm, hydraulic lifter and hybrid bearing assembly in accordance with the invention incorporated therein.

Referring first to FIG. 1, there is illustrated a portion of an engine which includes a cylinder head 10, which in a conventional manner would be fixed to a cylinder block, not shown. A poppet valve 11 having a stem 12 is reciprocably supported in a valve guide bore 14 in the cylinder head 10 for movement to open or close a port 15, which can be either an inlet port or an exhaust port. The poppet valve 11 is normally biased to its closed position, the position shown, by a valve return spring 16. The poppet valve 11 is suitably operated from a camshaft, not shown, as by a push rod 17, via an integral rocker arm, hydraulic lifter and bearing assembly, generally designated 20, constructed in accordance with the invention, which includes a rocker arm 21, having a hydraulic lash adjuster 22 supported therein and a composite or hybrid bearing, generally designated 50, the latter being used to pivotably support this assembly on a hollow rocker shaft 24.

As is conventional, the rocker shaft 24 is supported above the cylinder head 10 as by suitably spaced brackets 25, only one of which is shown. Also as well known, the rocker shaft 24 is provided with an axial extending passage 26 which is in continuous communication with the pressurized lubricant oil supply of the engine through suitable interconnecting passage means, not shown, and the rocker shaft is provided with at least one radial riser passage 27 for each rocker arm assembly, the riser passage 27, in the construction shown extending vertically up through the rocker shaft 24 from the passage 26.

Referring now to the rocker arm 21, it is provided with arms 31 and 30 overlying the upper ends of the push rod 17 and poppet valve 11, respectively, and with an intermediate central pivot portion 32 having a transverse bearing receiving bore 33 extending therethrough.

In the embodiment shown, the arm 30 is provided with a stepped blind bore 34 extending upward from its lower surface that is sized so as to receive the hydraulic lash adjuster 22. Since the hydraulic lash adjuster 22, which may also be referred to as a hydraulic valve lifter, can be of any suitable known type, it is not deemed necessary to describe it in detail herein. However, as shown, lash adjuster 22 has a retainer 35 fixed to its plunger body 36 whereby this lash adjuster can be retained in unit assembly with the rocker arm. As shown, the lower end portion of the plunger body 36 is provided with a rocker 37 for engagement with the upper free end of the stem 12 of the poppet valve 11.

The upper, enlarged internal diameter portion of bore 34 in the rocker arm defines a fluid reservoir 38 which is in communication with a bored passage 40 that extends through arm 30 and pivot portion 32 so as to open through the upper portion of the internal wall defined by the bearing receiving bore 33. The bore passage 40, at its outboard end, the right hand end with reference to FIG. 1, is partly closed by means of a plug 41 suitably fixed, as by press fit, into this bored passage, the plug 41 having a suitably sized orifice 42 passage therethrough whereby to provide drip lubrication to the valve stem 12. As shown, arm 31, on its bottom surface is spherically dished to define a socket 43 to socketably receive the upper end of the push rod 17.

Figure 2:
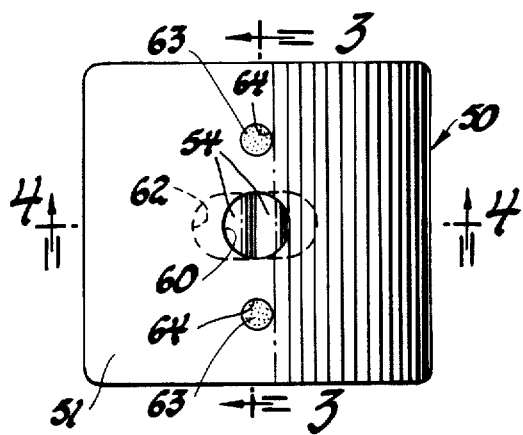
FIG. 2 is a top view of the hybrid bearing, per se, of FIG. 1.
Figure 3:
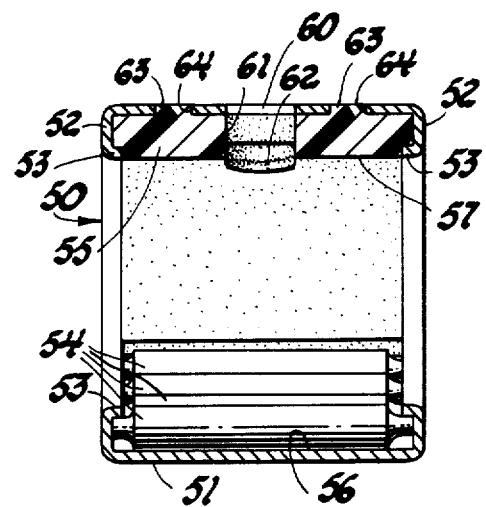
FIG. 3 is a sectional view of the hybrid bearing, per se, taken along line 3—3 of FIG. 2; and, FIG. 4 is a sectional view of the hybrid bearing, per se, taken along line 4—4 of FIG. 2.
Figure 4:
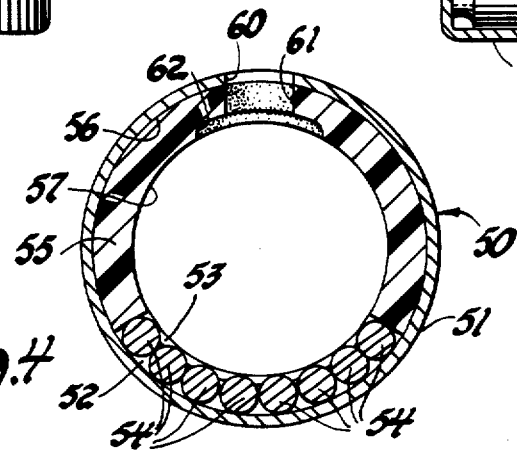

The composite or hybrid bearing 50, as best seen in FIGS. 2–4, includes a cylindrical outer race 51 having an outer peripheral surface of a diameter so as to be received in the internal wall of the rocker arm defined by bore 33. In a conventional manner, as shown for example in U.S. Pat. No. 3,539,232 issued Nov. 10, 1970 to Robert S. Batt, the outer race 51, drawn from sheet metal, is provided with radially inwardly directed, annular end lips or flanges 52, each of which terminates in a radially innermost, axially directed return bend portion 53.

In the embodiment of the subject hybrid bearing shown, these opposed flanges 52 are used to axially retain both a plurality of needles or rollers 54 and a semi-cylindrical bearing sleeve 55. In the construction shown, the rollers 54 are distributed in adjoining and axially parallel relation around approximately the lower ⅓ of the internal cylindrical surface 56 of the outer race 51, eight such rollers 54 being used in the construction shown. The bearing sleeve 55, made, for example, of a suitable plastic such as nylon 6/6 is secured so as to abut against the remaining approximately two-thirds of the upper, internal surface 56 of the outer race 51.

The internal diameter of the inner surface 57 of the bearing sleeve 55 and that defined by the roller 54 is formed complementary to the outside diameter of the rocker shaft 24 whereby these elements are positioned to operatively encircle the rocker shaft so as to pivotably support the rocker arm. However, as best shown in FIG. 1, since the forces of the push rod 17 and of the valve return spring 16 via the poppet valve 11 acting on the rocker arm 21, are both in a substantial vertical upward direction, with reference to this Figure, it is the rollers 54 portion of the hybrid bearing 50 which operatively engages the outer load bearing surface of the rocker shaft 24 whereby the rocker arm 21 is suitably pivotably journaled thereon.

The outer race 51 is provided with a central, radial aperture 60 and, the bearing sleeve 55 has a similarly located port 61 extending radially therethrough to effect flow communication between the riser passage 27 in the rocker shaft 24 and the passage 40 in the rocker arm 21 whereby lubricating fluid can be supplied to the fluid reservoir 38 encircling the lash adjuster 22, with the hybrid bearing 50 angularly positioned on the rocker shaft 24 as shown in FIG. 1. In addition, in the construction shown, an elongated slot recess 62 is provided in the inner surface 57 of the bearing sleeve 55 so as to extend axially a suitable distance on opposite sides of the port 61 whereby during the normal pivotable movement of the rocker arm 21, this slot recess 62 will maintain fluid communication with the riser passage 27.

In the construction shown, the bearing sleeve 55 is also provided with a pair of spaced apart, radially outward extending studs 63 that project into spaced apart apertures 64 provided for this purpose in the outer race 51, the studs 63 and apertures 64 being axially aligned with the port 61 and aperture 60, respectively, to effect proper axial alignment of these elements during assembly of the bearing sleeve 55 to the outer race 51.

With the construction shown, the bearing sleeve 55 is operative in the top oil feed arrangement using the vertical riser passage 27, as shown, to also serve as a limited oil seal, whereas if conventional rollers or needles were used in lieu of the bearing sleeve 55, lubricating oil could freely flow axially outward through the passages defined by the outer peripheral surfaces of adjacent rollers 54 and of the rocker shaft 24.

Thus the section of the hybrid bearing 50 containing the rollers 54 is used as the load bearing portion of this bearing assembly. The bearing sleeve 55 portion of the hybrid bearing 50 is used to maintain a diametral clearance between its inner surface 57 and the outer peripheral surface of the rocker shaft at a minimum, for example, of about 0.002 inch, so that an adequate supply of relatively high pressure lubricating oil can be delivered continuously to the hydraulic lash adjuster 22. Accordingly, the bearing sleeve is only used to maintain diametral clearance, since all of the load bearing work is done by the rollers 54 in the roller section of the hybrid bearing 50.

While the invention has been described with reference to the structure disclosed herein, it is not confined to the specific details set forth, since it is apparent that many modifications and changes can be made by those skilled in the art. For example, the aperture 60 in the outer race 51 and port 61 in the bearing sleeve 55 is lieu of being formed as round apertures can be configured to confrom to the slot recess 62. This application is intended to cover such modifications or changes as may come within the purposes of the improvements or scope of the following claims.

The embodiments of an invention in which an exclusive property or privilege is claimed are defined as follows:

1. A rocker arm assembly for use in the valve train of an internal combustion engine of the type having a fixed rocker shaft for supporting at least one rocker arm, the rocker shaft having an axial passage adapted to be in continuous communication with the pressurized lubricant supply of the engine and at least one radial riser passage extending from the axial passage; said rocker arm assembly including a rocker arm having a central pivot portion with a bearing receiving bore extending transversely therethrough and opposed drive and driven arms extending from said pivot portion, said drive arm having a lash adjuster socket therein with a passage means extending from said socket to said bore; a hydraulic lash adjuster operatively positioned in said socket; and, a needle bearing and oil feed means operatively positioned in said bore and encircling the rocker shaft over the riser passage, said needle bearing and oil feed means including an outer race having an inner cylinder race surface and a radial aperture in fluid communication with said passage means, a plurality of needles operatively positioned on said race surface in rolling contact with a portion of the shaft opposite the riser passage therein and, a semi-cylindrical sleeve bearing fixed to said outer race in operative engagement with said race surface between opposite end ones of said needles whereby to encircle the remaining portion of the shaft, said sleeve bearing having a radial extending port means effecting flow communication between the riser passage in the shaft and said aperture in said outer race whereby lubricant can be supplied to said hydraulic lash adjuster.

2. A rocker arm assembly for use in the valve train of an internal combustion engine of the type having a fixed rocker shaft for supporting at least one rocker arm, the rocker shaft having an axial passage adapted to be in continuous communication with the pressurized lubricant supply of the engine and at least one radial riser passage extending from the axial passage; said rocker arm assembly including a rocker arm having opposed arms and a central pivot portion with a bearing receiving bore extending transversely therethrough; one of said arms having a lash adjuster socket therein with a passage means extending from said socket to said bore; a hydraulic lash adjuster operatively positioned in said socket; and, a composite bearing operatively positioned in said bore and encircling the rocker shaft over the riser passage, said composite bearing including an outer race having an inner cylinder race surface and a radial aperture in fluid communication with said passage means, a plurality of needles operatively positioned on said race surface in rolling contact with a portion of the shaft opposite the riser passage therein and, a semi-cylindrical sleeve bearing fixed to said outer race in operative engagement with said race surface and located between opposite end ones of said needles whereby to encircle the remaining portion of the shaft, said sleeve bearing having a radial extending port means effecting flow communication between the riser passage in the shaft and said aperture in said outer race whereby lubricant can be supplied to said hydraulic lash adjuster.

3. A rocker arm assembly for use in the valve train of an internal combustion engine of the type having a fixed rocker shaft for supporting at least one rocker arm, the rocker arm having an axial passage adapted to be in continuous communication with the pressurized lubricant supply of the engine and at least one radial riser passage extending from the axial passage; said rocker arm assembly including a rocker arm having opposed arms and a central pivot portion with a bearing receiving bore extending transversely therethrough, one of said arms having a lash adjuster socket therein with a passage means extending from said socket to said bore; a hydraulic lash adjuster operatively positioned in said socket; and, a hybrid bearing operatively positioned in said bore and encircling the rocker shaft over the riser passage, said hybrid bearing including an outer race having an inner cylinder race surface, a plurality of roller means operatively positioned on said race surface in rolling contact with a portion of the shaft opposite the riser passage therein and, a semi-cyindrical sleeve bearing fixed to said outer race in operative engagement with said race surface between opposite end ones of said roller means whereby to encircle the remaining portion of the shaft, said sleeve bearing and said outer race having a radial extending port means therethrough effecting flow communication with the riser passage in the shaft whereby lubricant can be supplied to said hydraulic lash adjuster during pivotable movement of said rocker arm on the rocker shaft.

* * * * *